(12) United States Patent
Onoda et al.

(10) Patent No.: US 10,014,603 B2
(45) Date of Patent: Jul. 3, 2018

(54) POWER SOURCE CONNECTION SYSTEM

(71) Applicants: Yazaki Corporation, Tokyo (JP); TOYOTA JIDOSHA KABUSHIKI KAISHA, Toyota-shi, Aichi-ken (JP)

(72) Inventors: Shinya Onoda, Shizuoka (JP); Muneyuki Fujisaka, Miyoshi (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/725,737

(22) Filed: Oct. 5, 2017

(65) Prior Publication Data
US 2018/0102599 A1    Apr. 12, 2018

(30) Foreign Application Priority Data
Oct. 12, 2016 (JP) ................... 2016-200785

(51) Int. Cl.
| | |
|---|---|
| H01R 13/688 | (2011.01) |
| H01R 11/28 | (2006.01) |
| H01M 2/30 | (2006.01) |
| H01R 4/30 | (2006.01) |
| H01R 13/40 | (2006.01) |
| H01R 13/58 | (2006.01) |
| H01R 13/696 | (2011.01) |

(52) U.S. Cl.
CPC .......... *H01R 11/281* (2013.01); *H01M 2/305* (2013.01); *H01R 4/30* (2013.01); *H01R 13/40* (2013.01); *H01R 13/58* (2013.01); *H01R 13/696* (2013.01); *H01M 2220/20* (2013.01)

(58) Field of Classification Search
CPC .. H01R 13/688; H01R 11/281; H01R 11/287; H01R 13/684; H01R 13/68; H01R 11/282; H01R 11/283; H01H 85/2035
USPC ................ 439/620.01–620.26, 761–764
See application file for complete search history.

(56) References Cited

U.S. PATENT DOCUMENTS

| | | | |
|---|---|---|---|
| 5,645,448 A * | 7/1997 | Hill | H01H 85/205 439/522 |
| 7,663,466 B1 * | 2/2010 | Jetton | H01H 85/044 337/186 |

(Continued)

FOREIGN PATENT DOCUMENTS

| | | |
|---|---|---|
| JP | 2001-256878 A | 9/2001 |
| JP | 2007-087823 A | 4/2007 |
| JP | 2011-222189 A | 11/2011 |

*Primary Examiner* — Gary Paumen
(74) *Attorney, Agent, or Firm* — Sughrue Mion, PLLC (57) ABSTRACT

Included are a battery terminal connected to a battery post erected on a first surface of a battery, a battery connection unit provided with an electronic component connected to the battery terminal and to which ends of electric wires are connected, and a accommodating member that accommodates the battery terminal and the battery connection unit. The accommodating member has a through-hole through which the battery post is inserted, a terminal accommodating chamber in which a free end side of the battery post inserted through the through-hole is arranged and which accommodates the battery terminal connected to the free end side, and a butting portion that is projected from a periphery of the through-hole toward the first surface of the battery and made abut on the first surface.

4 Claims, 9 Drawing Sheets

(56) References Cited

U.S. PATENT DOCUMENTS

| | | | |
|---|---|---|---|
| 7,978,046 B2* | 7/2011 | Ohashi | H01H 85/044 |
| | | | 337/186 |
| 8,636,550 B2* | 1/2014 | Onoda | H01R 13/447 |
| | | | 439/762 |
| 2004/0166737 A1* | 8/2004 | Cheng | H01H 85/205 |
| | | | 439/620.26 |
| 2009/0068894 A1* | 3/2009 | Ohashi | H01R 11/12 |
| | | | 439/620.26 |
| 2012/0302098 A1* | 11/2012 | Matsumoto | H01H 85/12 |
| | | | 439/620.26 |
| 2013/0027174 A1 | 1/2013 | Masuda et al. | |
| 2014/0094062 A1* | 4/2014 | Onoda | H01R 11/281 |
| | | | 439/620.26 |
| 2015/0236436 A1* | 8/2015 | Freitag | H01R 11/287 |
| | | | 439/763 |
| 2015/0325934 A1* | 11/2015 | Freitag | H01R 11/287 |
| | | | 439/763 |
| 2016/0203936 A1* | 7/2016 | Onoda | H01H 85/0241 |
| | | | 337/190 |
| 2016/0204555 A1* | 7/2016 | Sueyoshi | H01H 85/12 |
| | | | 439/620.26 |

* cited by examiner

POWER SOURCE CONNECTION SYSTEM

CROSS-REFERENCE TO RELATED APPLICATION(S)

The present application claims priority to and incorporates by reference the entire contents of Japanese Patent Application No. 2016-200785 filed in Japan on Oct. 12, 2016.

BACKGROUND OF THE INVENTION

1. Field of the Invention

The present invention relates to a power source connection system.

2. Description of the Related Art

In a vehicle-mounted battery in the related art, a power source connection system may be connected to a battery post. The power source connection system includes a battery terminal that is electrically connected to a battery and a battery connection unit provided with an electronic component that is electrically connected to this battery terminal. In this power source connection system, an end of an electric wire is physically and electrically connected to an electronic component of a battery connection unit, and the electric wire is drawn outward. For example, Japanese Patent Application Laid-open No. 2007-87823, Japanese Patent Application Laid-open No. 2001-256878, and Japanese Patent Application Laid-open No. 2011-222189 disclose a power source connection system that includes a fuse unit as a battery connection unit.

Incidentally, in this power source connection system, actions of acceleration/deceleration during vehicle travel on a battery or an electric wire, or transmission of vibrations of a vehicle body due to, for example, a road surface input to a battery or an electric wire causes an external input in accordance with the acceleration/deceleration or the vibrations to be transmitted to a battery terminal or a battery connection unit via the battery or the electric wire. In this power source connection system, an electric wire is drawn outward. Therefore, a relative moving distance to a vehicle body is larger in this electric wire than in a battery, which may lead to an external input larger from the electric wire than from a battery side. For example, when the possibility becomes reality, an external input from an electric wire may be transmitted to a battery post as a load via a battery terminal.

SUMMARY OF THE INVENTION

Thus, an object of the present invention is to provide a power source connection system capable of reducing a load that acts on a battery post.

In order to achieve the above mentioned object, a power source connection system according to one aspect of the present invention includes a battery terminal that is physically and electrically connected to a battery post erected on an outer wall surface of a battery; a battery connection unit provided with an electronic component which is physically and electrically connected to the battery terminal and to which ends of electric wires drawn outward are physically and electrically connected; and an accommodating member configured to accommodate the battery terminal and the battery connection unit, wherein the accommodating member has a through-hole through which the battery post is inserted, a terminal accommodating chamber in which a free end side of the battery post inserted through the through-hole is arranged and which accommodates the battery terminal physically and electrically connected to the free end side, and a butting portion which is projected from a periphery of the through-hole toward the outer wall surface of the battery and made abut on the outer wall surface.

According to another aspect of the present invention, in the power source connection system, it is preferable that the butting portion is cylindrically formed to enclose an outer peripheral wall of the battery post with an inner peripheral wall of the butting portion and has an annular end portion in an axial direction of the cylinder made abut on the outer wall surface.

According to still another aspect of the present invention, in the power source connection system, it is preferable that the electronic component is a fuse circuit body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A power source connection system according to an embodiment of the present invention will be described below in detail based on the drawings. This present invention is not limited to this embodiment.

Embodiments

A power source connection system according to one of embodiments of the present invention will be described below based on FIGS. 1 to 10.

Figure 1:
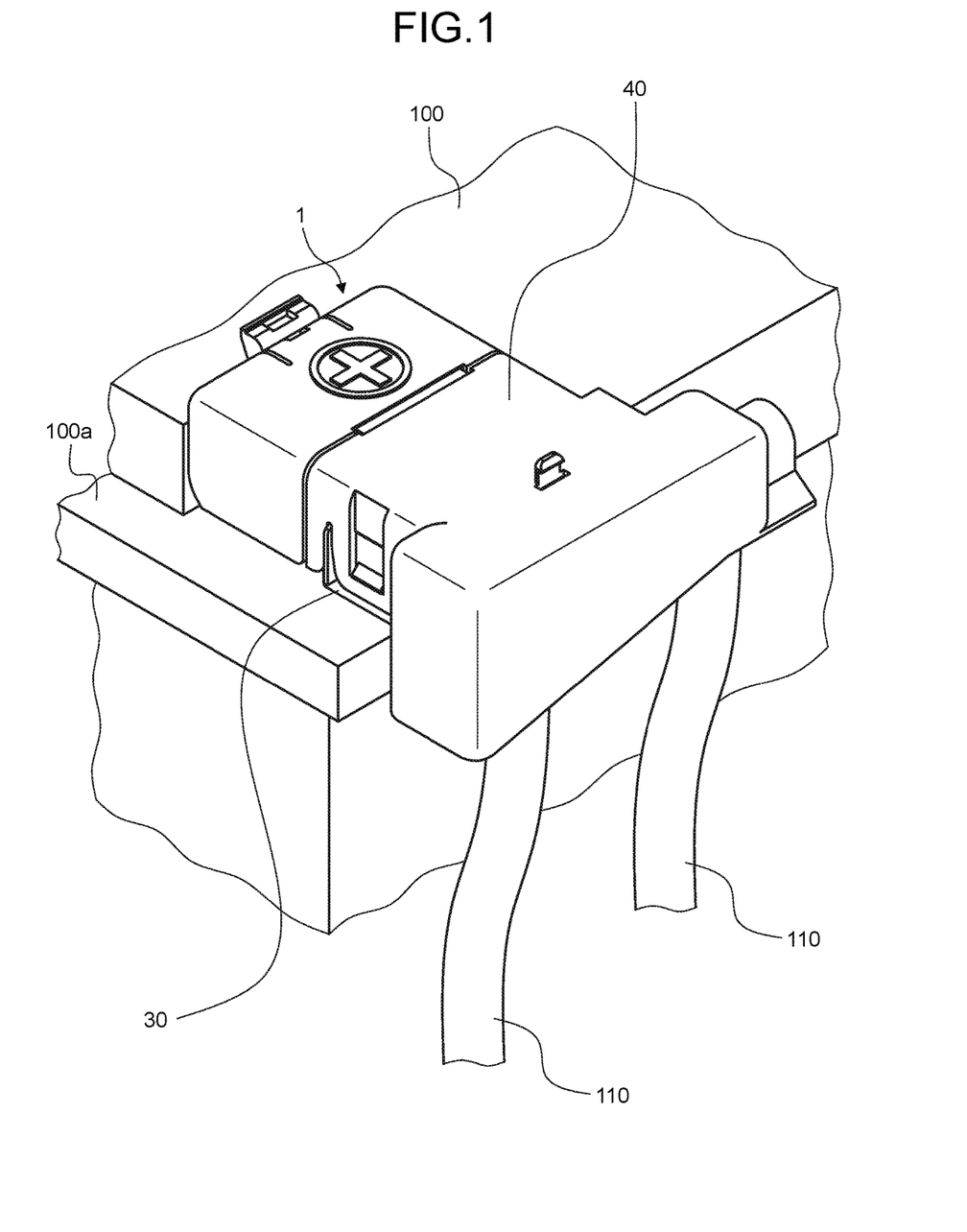
FIG. 1 is a perspective view illustrating a power source connection system according to an embodiment of the present invention, mounted on a battery.
Figure 2:
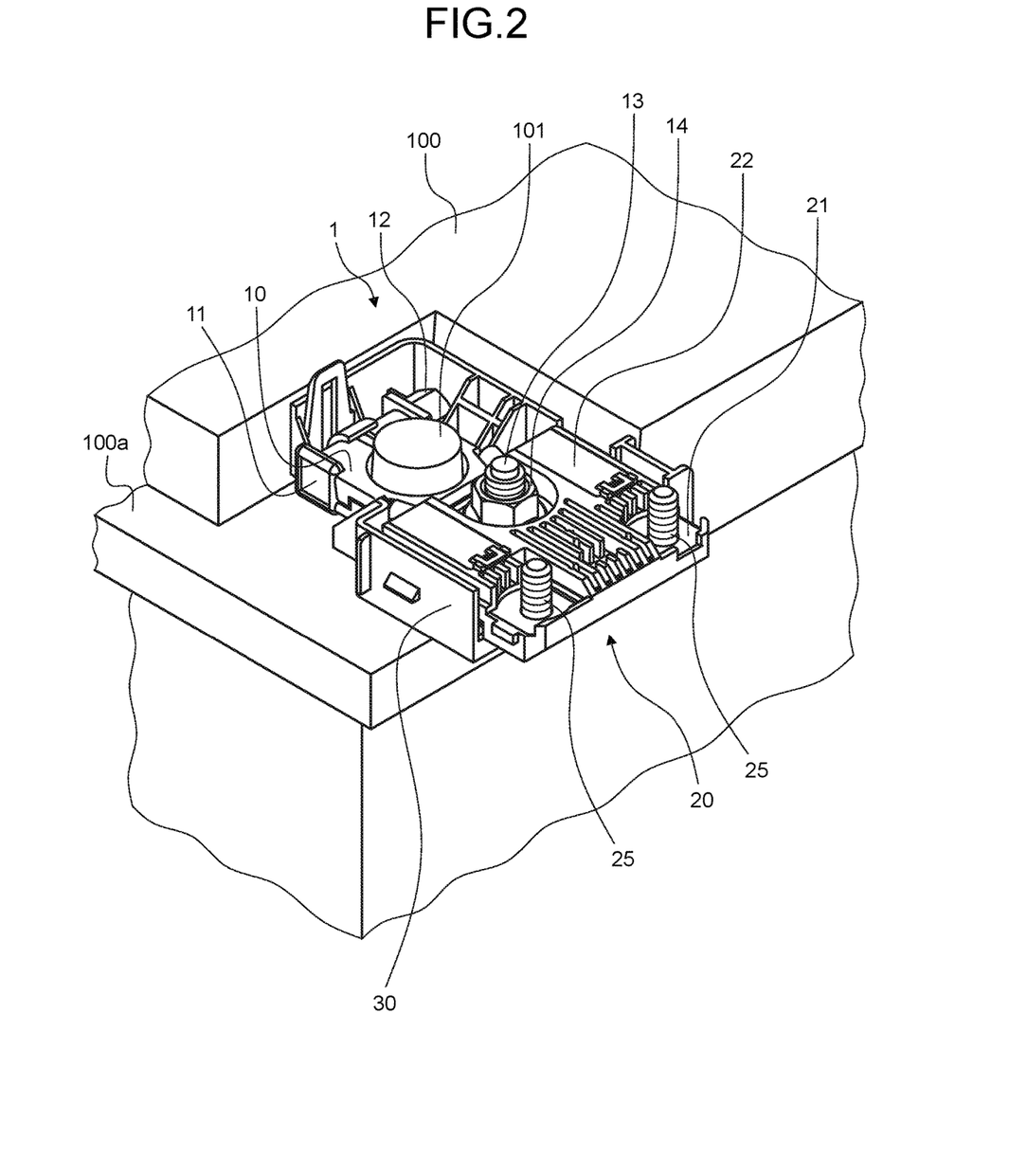
FIG. 2 is a perspective view illustrating a power source connection system (without a cover member) according to an embodiment, mounted on a battery.
Figure 3:
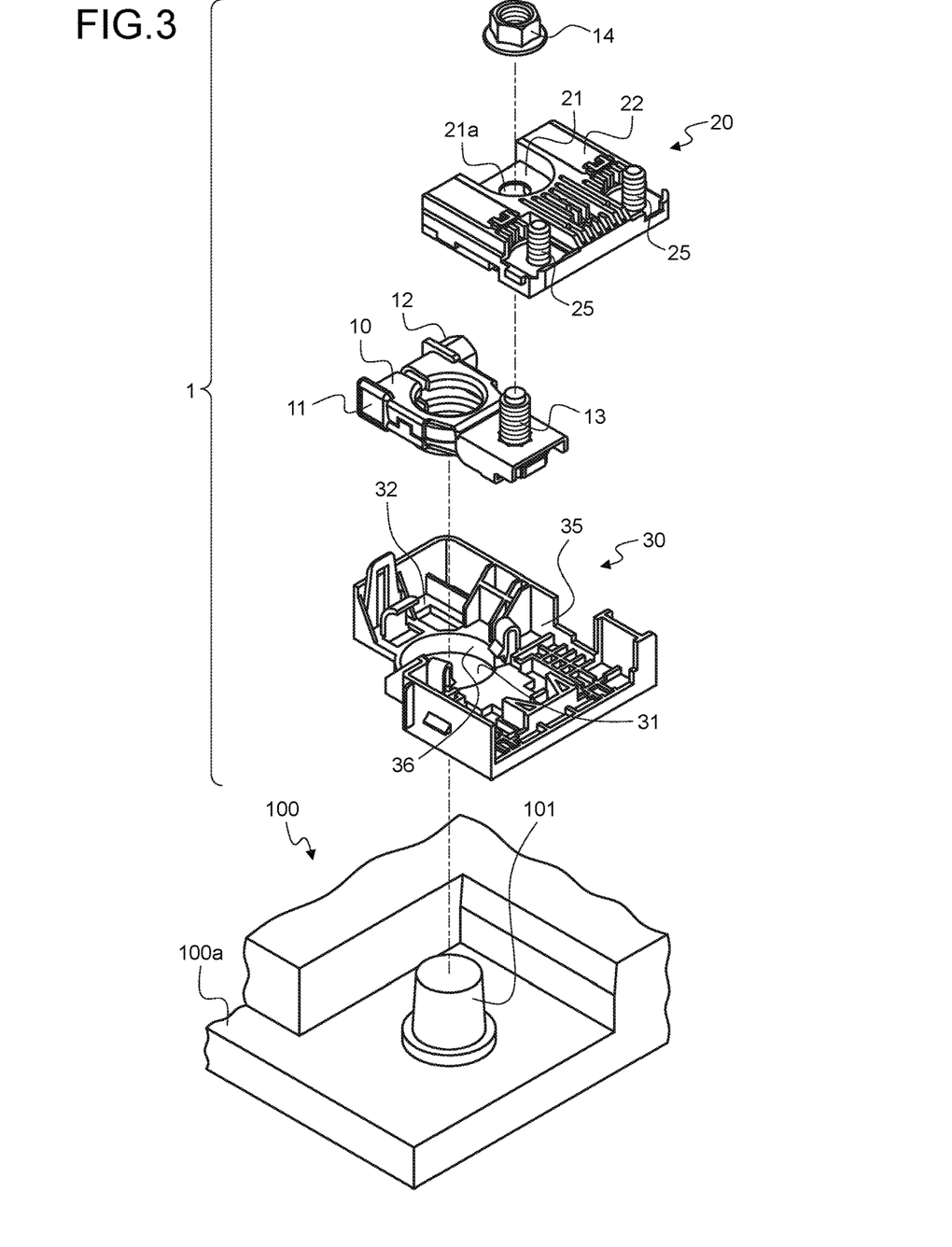
FIG. 3 is an exploded perspective view of a power source connection system (without a cover member)

Sign 1 in FIGS. 1 to 3 indicates a power source connection system according to the present embodiment. A power source connection system 1 includes a battery terminal 10 and at least one battery connection unit 20 (FIGS. 2 and 3). This power source connection system 1 is interposed between a battery post 101 and electric wires 110 (FIG. 1) by being mounted on a battery 100, and electrically connects the battery terminal 10 and an electronic component 21 of the battery connection unit 20 to the battery post 101 and the electric wires 110. The battery post 101 is erected on a first surface 100a, one of outer wall surfaces of the battery 100, and the battery terminal 10 is, as described later, physically and electrically connected to the battery post 101. The power source connection system 1 in this example is mounted on a positive side of the battery post 101.

The battery terminal 10 is formed of conductive material such as metal and physically and electrically connected to the battery post 101. The battery terminal 10 in this example is formed of a metal plate as a base material, and has a male screw member 11 and a female screw member 12 mounted (FIGS. 2 and 3). The battery terminal 10 is crimped to the battery post 101 by tightening the male screw member 11 and the female screw member 12, and thus is physically and electrically connected to this battery post 101.

This battery terminal 10 is also provided with at least one another male screw member 13. The male screw member 13 is to electrically connect the electronic component 21 of the battery connection unit 20 to the battery terminal 10. One male screw member 13 in this example is mounted on the battery terminal 10, projected in the same direction as the battery post 101. By threadedly engaging a female screw member 14 with this male screw member 13, the battery terminal 10 is co-fastened to the electronic component 21 of the battery connection unit 20 and electrically connected to the electronic component 21.

To this battery terminal 10, an electric connection portion (illustration omitted) at an end of each electric wire 110 may be directly connected physically and electrically, or indirectly connected electrically via the electronic component 21 of the battery connection unit 20. An electric connection portion is an exposed core wire at the end of the electric wire 110, or a terminal physically and electrically connected to the core wire through crimping, for example.

The battery connection unit 20 is a connection unit that is connected to the battery 100, and includes the electronic component 21 and a supporting member 22 that supports this electronic component 21 (FIGS. 2 and 3). The battery connection unit 20 in this example is configured as a fuse unit and includes a protection circuit component (fuse circuit body) as the electronic component 21. The supporting member 22 is molded of insulating material such as synthetic resins, and inwardly supports the electronic component 21. The fuse circuit body has a fusible body on an energizing path between sides of the battery terminal 10 and the electric wire 110. This fuse circuit body is co-fastened to the battery terminal 10 by threadedly engaging the male screw member 13 with the female screw member 14 and physically and electrically connected to this battery terminal 10. Therefore, the electronic component 21 includes a through-hole 21a through which the male screw member 13 is inserted (FIG. 3). Additionally, this battery connection unit 20 is provided with male screw members 25 that are electrically connected to the fuse circuit body. Each male screw member 25 is erected for each electric wire 110. In this example, two male screw members 25 are provided. The fuse circuit body is co-fastened to the electric connection portion at the end of the electric wire 110 by threadedly engaging each male screw member 25 with a female screw member (illustration omitted) and electrically connected to the electric wire 110. The electric wire 110 is drawn outward from this power source connection system 1.

The power source connection system 1 includes an accommodating member 30 that accommodates the battery terminal 10 and the battery connection unit 20 (FIGS. 1 to 3). The accommodating member 30 is molded of insulating material such as synthetic resins.

The accommodating member 30 has a circular through-hole 31 through which the battery post 101 in a column shape is inserted (FIGS. 4 and 5), and is mounted on the first surface 100a of the battery 100 such that the battery post 101 is inserted through this through-hole 31. In the accommodating member 30, a terminal accommodating chamber 32 that accommodates the battery terminal 10 in the mounted condition is formed. A free end side of the battery post 101 inserted through the through-hole 31 is arranged in the terminal accommodating chamber 32. In the terminal accommodating chamber 32, the battery terminal 10 is placed on the accommodating member 30 while the battery post 101 is inserted from the free end side. The battery terminal 10 is physically and electrically connected to the free end side of the battery post 101.

Figure 4:
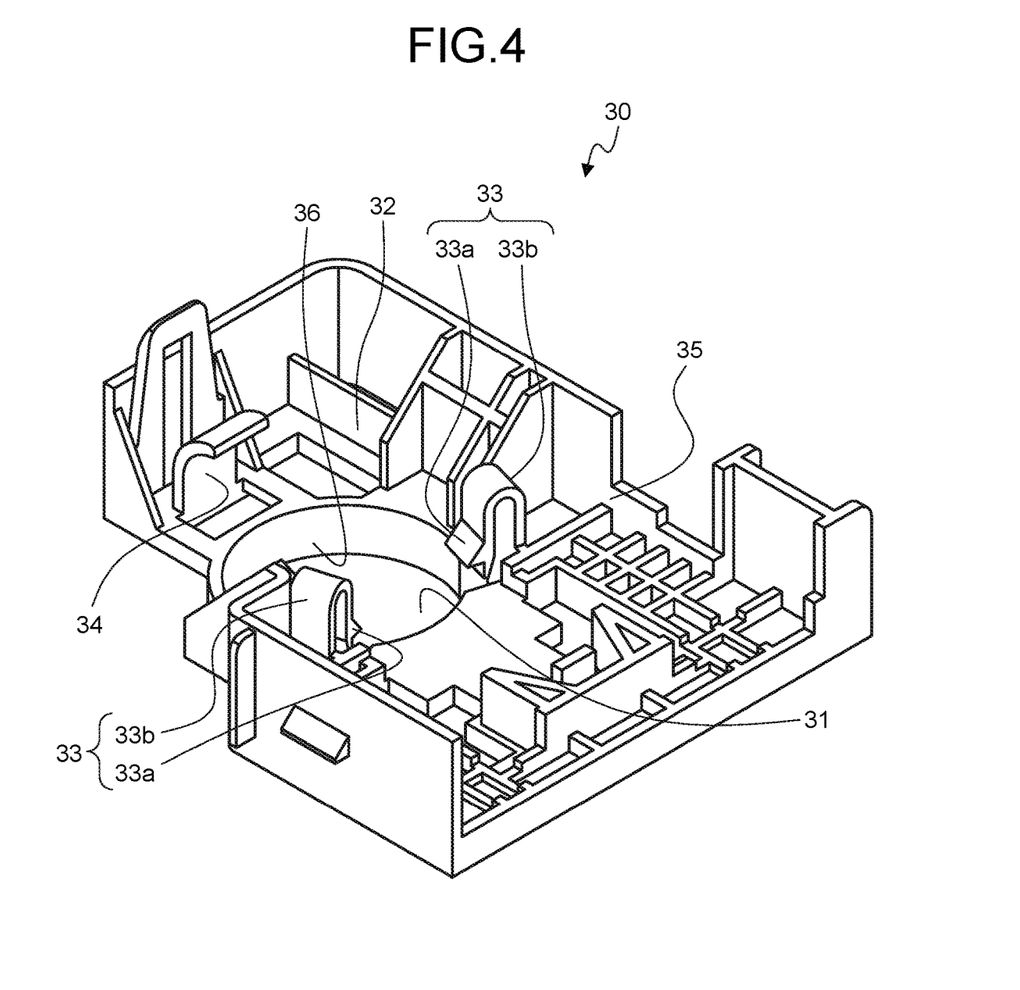
FIG. 4 is a perspective view of an accommodating member viewed from a terminal accommodating chamber side.
Figure 5:
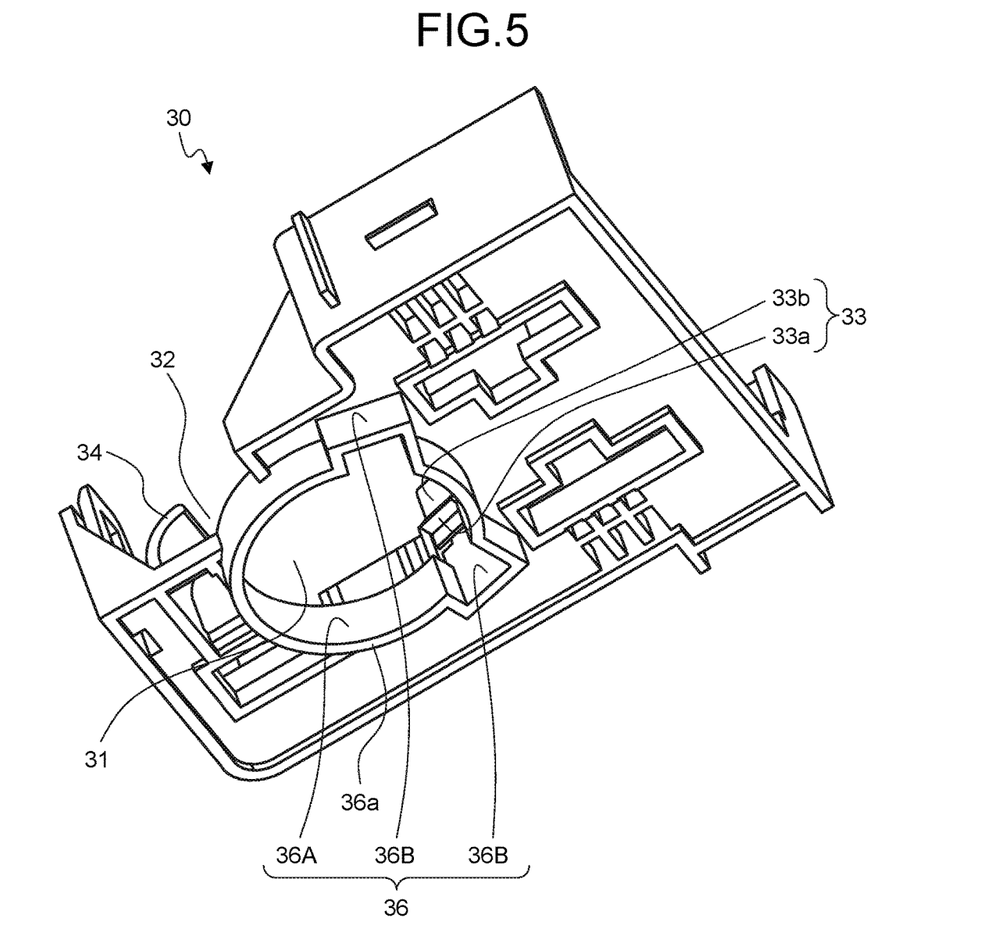
FIG. 5 is a perspective view of an accommodating member viewed from a butting portion side.
Figure 6:
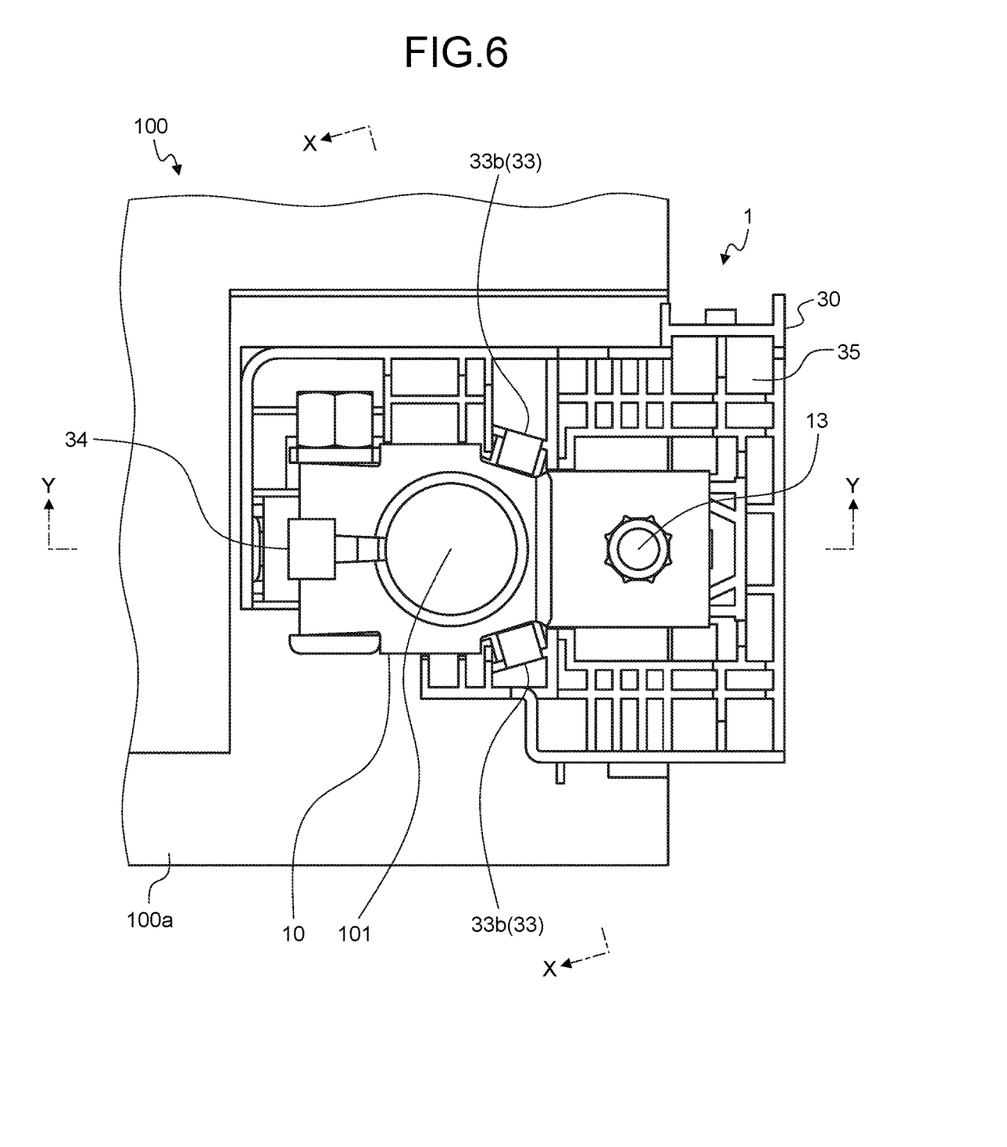
FIG. 6 is a top view illustrating an accommodating member and a battery terminal mounted on a battery.

The accommodating member 30 includes a locking structure for locking the battery terminal 10 accommodated in the terminal accommodating chamber 32. The locking structure is to keep the battery terminal 10 accommodated in the terminal accommodating chamber 32. The accommodating member 30 in this example has first terminal locking bodies 33 and a second terminal locking body 34 as a locking structure (FIGS. 4 to 6). The first terminal locking bodies 33 and the second terminal locking body 34 are projected from an inner wall of the accommodating member 30 toward inside of the terminal accommodating chamber 32.

Figure 7:
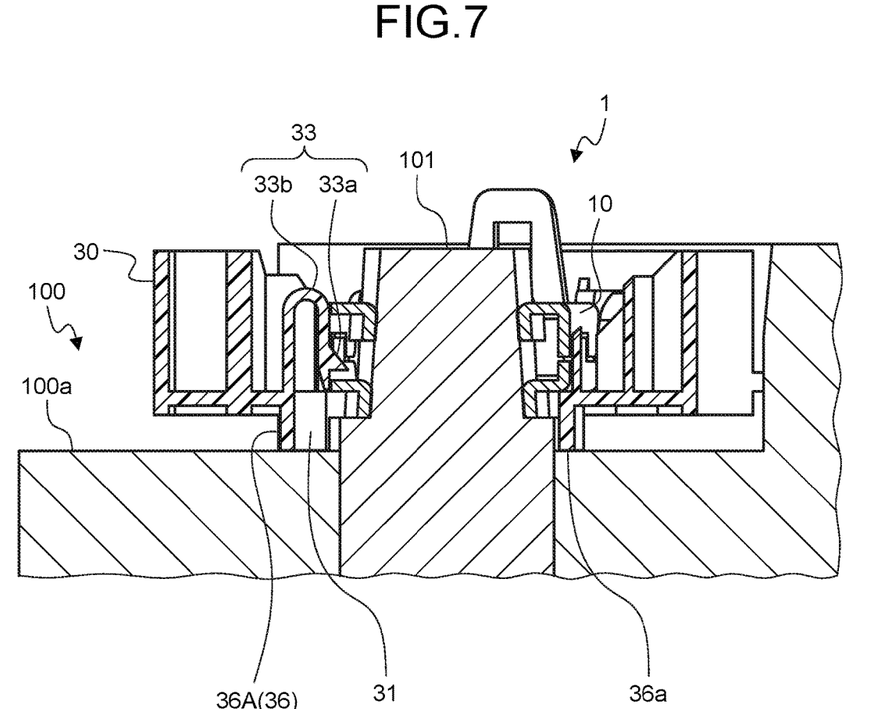
FIG. 7 is a sectional view taken along line X-X in FIG. 6.

The first terminal locking bodies 33 are projected from a periphery of the through-hole 31 toward the inside of the terminal accommodating chamber 32. Each of these first terminal locking bodies 33 has a pawl portion 33a and a flexible portion 33b (FIGS. 4, 5, and 7). The pawl portion 33a is to be hooked to the battery terminal 10 accommodated in the terminal accommodating chamber 32. The flexible portion 33b is pushed and moved to bend by the battery terminal 10 via the pawl portion 33a during the accommodating process and returns to an original shape after accommodating of the battery terminal 10 is completed. The pawl portion 33a is to lock movement of the battery terminal 10 in a direction opposite to a direction of the accommodating. The flexible portion 33b is a U-shaped plate-like body with one end thereof arranged in the periphery of the through-hole 31, and the other end arranged inside the periphery of the through-hole 31 in a radial direction is provided with the pawl portion 33a. The pawl portion 33a is projected inward in the radial direction. In this example, this first terminal locking body 33 is arranged at two locations in the periphery of the through-hole 31 in a circumferential direction. The second terminal locking body 34 is formed in a shape along an outer wall surface of the battery terminal 10 and by fitting the outer wall surface therein locks the movement of the battery terminal 10 in the direction opposite to the accommodating direction. The second terminal locking body 34 in this example is formed in an arc shape in line with a curved surface shape of the battery terminal 10 and has flexibility in order to bend when the battery terminal 10 is fit therein. These first terminal locking body 33 and second terminal locking body 34 are to improve an effect of suppressing falling-off of the battery terminal 10 from the terminal accommodating chamber 32 and to suppress relative rotation of the battery terminal 10 in the terminal accommodating chamber 32 around an axis of the battery post 101.

Furthermore, this accommodating member 30 is provided with a unit accommodating chamber 35 that accommodates the battery connection unit 20 (FIGS. 3, 4, and 6). The battery connection unit 20 is mounted on the battery terminal 10 accommodated in the terminal accommodating chamber 32. Thus, the male screw member 13 of the battery terminal 10 accommodated in the terminal accommodating chamber 32 is arranged in the unit accommodating chamber 35. In this unit accommodating chamber 35, the electronic component 21 of the battery connection unit 20 is placed on the battery terminal 10 while the male screw member 13 is inserted through the through-hole 21a, and the supporting member 22 of the battery connection unit 20 is placed on the accommodating member 30.

The power source connection system 1 includes a cover member 40 that is mounted on the accommodating member 30 (FIG. 1). The cover member 40 is to cover the battery terminal 10 and the battery connection unit 20 that are accommodated in the accommodating member 30 together with the battery post 101 and the electric connection portion at the end of the electric wire 110. This cover member 40 is molded of insulating material such as synthetic resins.

Meanwhile, in this power source connection system 1, a butting portion 36 is provided in the accommodating member 30 in order to reduce a load on the battery post 101 when a load acts on the battery post 101 (FIGS. 4, 5, and 7 to 10). The butting portion 36 is projected, in the accommodating member 30 mounted on the battery 100, from the periphery of the through-hole 31 toward the first surface 100a of the battery 100 and is made abut on the first surface 100a.

For example, in this power source connection system 1, an external input in accordance with acceleration/deceleration during vehicle travel or vibrations of a vehicle body acts on the battery connection unit 20 from the electric wire 110, and a load in accordance with the external input acts on the battery terminal 10 and placing surfaces of the accommodating member 30 from the battery connection unit 20. In addition, in this power source connection system 1, acceleration/deceleration during vehicle travel or vibrations of a vehicle body may also act on the battery connection unit 20. On this occasion, a load in accordance with the acceleration/deceleration or the vibrations act on the battery terminal 10 and the placing surfaces of the accommodating member 30 from the battery connection unit 20. Furthermore, in this power source connection system 1, not only a load from the battery connection unit 20 but also acceleration/deceleration during vehicle travel or vibrations of a vehicle body may act on the battery terminal 10, and a load attributable thereto acts on the battery post 101 and the placing surfaces of the accommodating member 30 from the battery terminal 10. However, in this power source connection system 1, when a load acts from the battery connection unit 20 and the battery terminal 10 on each of the placing surfaces of the accommodating member 30, the load can be received on the first surface 100a of the battery 100 via the butting portion 36, and thus a load that acts on the battery post 101 can be reduced. In this way, the power source connection system 1 according to the present embodiment can spread a load that acts on the battery post 101 to the first surface 100a of the battery 100, and thus this load on the battery post 101 can be reduced.

Figure 10:
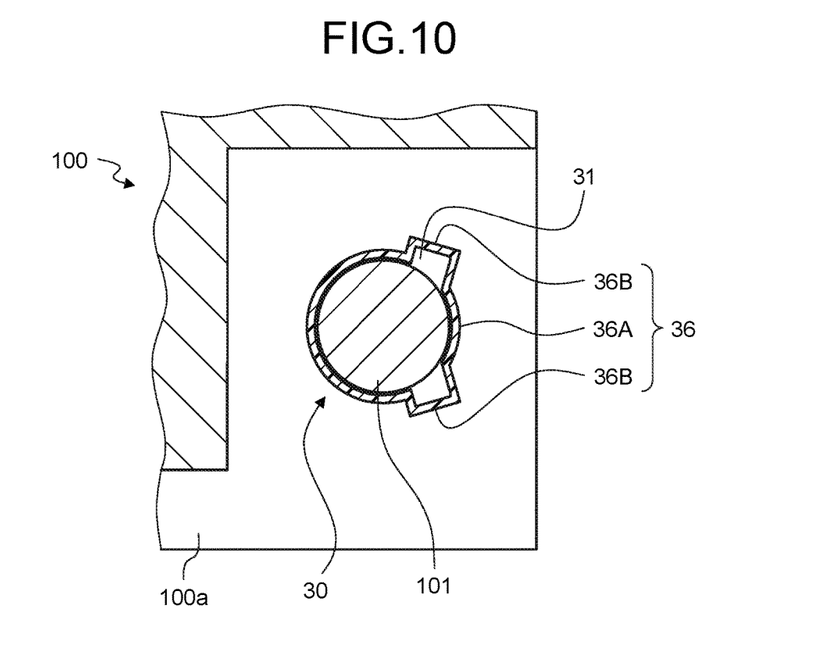
FIG. 10 is a sectional view taken along line Z-Z in FIG. 8.

Specifically, the butting portion 36 in this example is cylindrically formed to enclose with an inner peripheral wall thereof an outer peripheral wall of the battery post 101, and has an annular end portion 36a in an axial direction of the cylinder made abut on the first surface 100a of the battery 100 (FIGS. 5 and 10). As a result, when a load acts from the battery connection unit 20 or the battery terminal 10 on each of the placing surfaces of the accommodating member 30, this power source connection system 1 can receive this load on the first surface 100a of the battery 100 via the butting portion 36 regardless of an acting direction of the load. Thus, this power source connection system 1 can reduce a load that acts on the battery post 101 regardless of an acting direction of the load by having the butting portion 36 formed in such a shape. Therefore, this load on the battery post 101 can be further reduced to improve durability of the battery 100 more appropriately.

Figure 8:
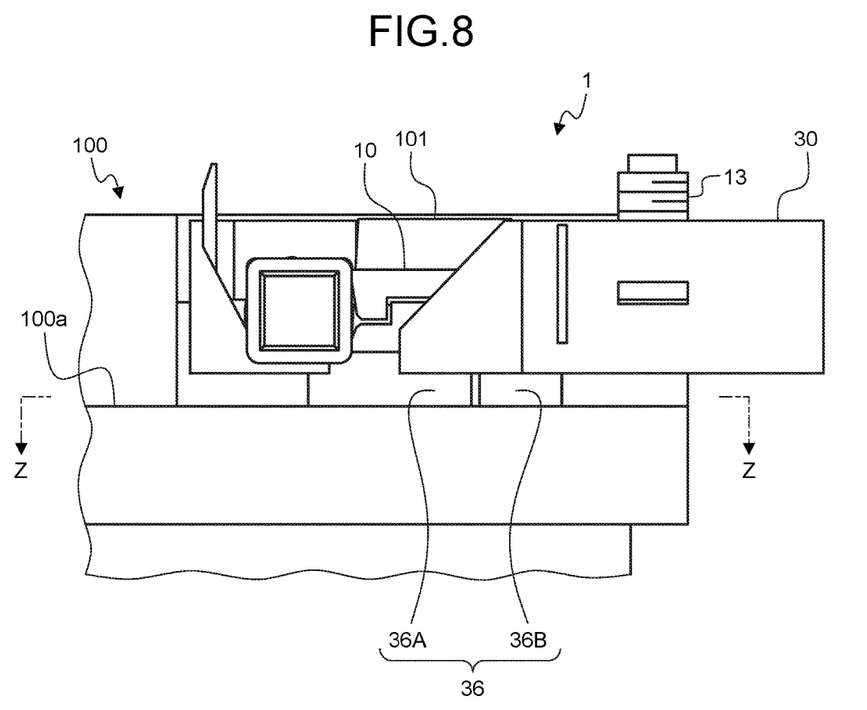
FIG. 8 is a front view illustrating an accommodating member and a battery terminal mounted on a battery.
Figure 9:
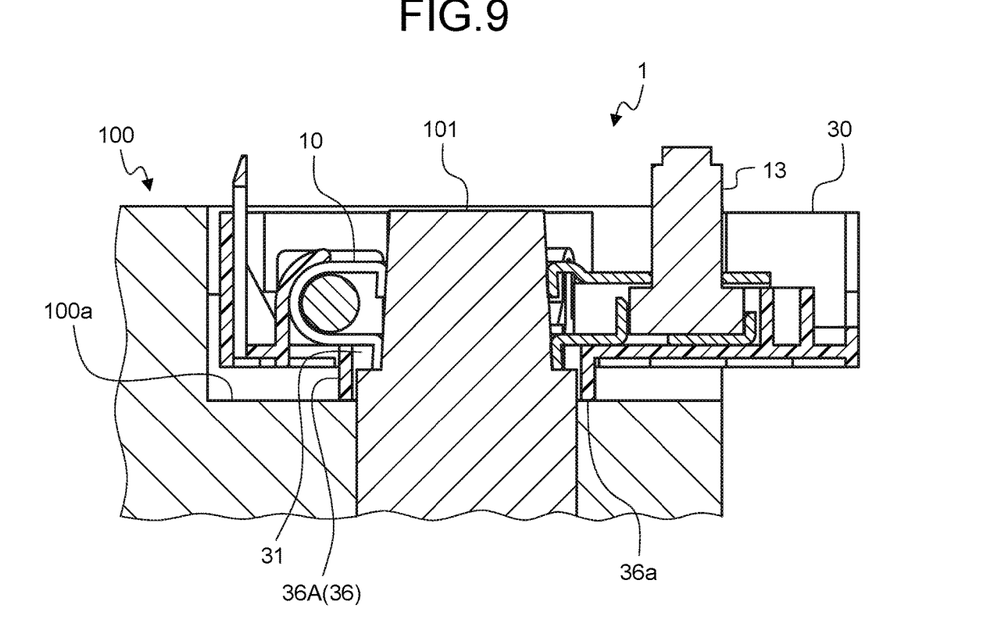
FIG. 9 is a sectional view taken along line Y-Y in FIG. 6.

Here, the butting portion 36 in this example has an annular section 36A in an annular shape and bulging portions 36B. The annular section 36A is projected from the periphery of the through-hole 31 toward the first surface 100a of the battery 100. The bulging portions 36B are parts of this annular section 36A in a circumferential direction, bulged outward in a U shape in a radial direction (FIGS. 5, 8, and 10). Inward space of each bulging portion 36B is provided to demold a molding die in forming the first terminal locking body 33. Therefore, the bulging portion 36B is provided at a position to match arrangement of the first terminal locking body 33. In this example, the bulging portion 36B is provided for each first terminal locking body 33.

As described above, a load on the battery post 101 is reduced by spreading a load through the butting portion 36 of that type of the accommodating member 30. Therefore, the power source connection system 1 according to the present embodiment can improve durability of the battery 100. Furthermore, this power source connection system 1 can cover the outer peripheral wall of the battery post 101 with the inner peripheral wall of the butting portion 36 and cause this butting portion 36 to function as a contact suppressing body of other components with the battery post 101, and thus can enhance insulation against the battery post 101.

A power source connection system according to the embodiment is provided with a butting portion in a accommodating member that accommodates a battery terminal and a battery connection unit. The butting portion is projected from a periphery of a through-hole through which a battery post is inserted toward an outer wall surface of a battery and is made abut on the outer wall surface. In this power source connection system, therefore, when a load acts on the accommodating member from the battery terminal or the battery connection unit, it is possible to receive the load on the outer wall surface of the battery via the butting portion, and thus a load that acts on the battery post can be reduced. In this way, this power source connection system can spread a load that acts on the battery post to the outer wall surface of the battery, and thus load on the battery post can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A power source connection system comprising:
    a battery terminal that is physically and electrically connected to a battery post erected on an outer wall surface of a battery;
    a battery connection unit provided with an electronic component which is physically and electrically con- nected to the battery terminal and to which ends of electric wires drawn outward are physically and electrically connected; and an accommodating member configured to accommodate the battery terminal and the battery connection unit, wherein the accommodating member has a through-hole through which the battery post is inserted, a terminal accommodating chamber in which a free end side of the battery post inserted through the through-hole is arranged and which accommodates the battery terminal physically and electrically connected to the free end side, and a butting portion which is projected from a periphery of the through-hole toward the outer wall surface of the battery and made to abut on the outer wall surface.

2. The power source connection system according to claim 1, wherein the butting portion is cylindrically formed to enclose an outer peripheral wall of the battery post with an inner peripheral wall of the butting portion and has an annular end portion in an axial direction made abut on the outer wall surface.

3. The power source connection system according to claim 1, wherein the electronic component is a fuse circuit body.

4. The power source connection system according to claim 2, wherein the electronic component is a fuse circuit body.

* * * * *